US010106190B2

(12) United States Patent
Bremkens et al.

(10) Patent No.: US 10,106,190 B2
(45) Date of Patent: Oct. 23, 2018

(54) METHODS AND APPARATUS FOR DETERMINING KINETIC FRICTION IN ELECTROMECHANICAL STEERING ACTUATORS

(71) Applicant: Ford Global Technologies, LLC, Dearborn, MI (US)

(72) Inventors: Jan Bremkens, Straelen (DE); Oliver Nehls, Düsseldorf (DE); Joseph Park, Saint Clair Shores, MI (US); Lodewijk Wijffels, Canton, MI (US); Cornelius Macfarland, Garden City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/436,109

(22) Filed: Feb. 17, 2017

(65) Prior Publication Data

US 2018/0237056 A1     Aug. 23, 2018

(51) Int. Cl.
*B62D 5/04* (2006.01)
*B62D 15/02* (2006.01)
*B62D 6/10* (2006.01)
*G01L 5/00* (2006.01)
*G01L 5/22* (2006.01)

(52) U.S. Cl.
CPC .......... *B62D 5/0463* (2013.01); *B62D 6/10* (2013.01); *B62D 15/021* (2013.01); *B62D 15/025* (2013.01); *G01L 5/0042* (2013.01); *G01L 5/221* (2013.01)

(58) Field of Classification Search
CPC ...... B62D 5/0463; B62D 6/10; B62D 15/021; B62D 15/025; G01L 5/221; G01L 5/0042
See application file for complete search history.

(56) References Cited

U.S. PATENT DOCUMENTS

| 5,473,539 | A | * | 12/1995 | Shimizu et al. | ..... B62D 5/0463 |
| | | | | | 701/41 |
| 5,740,040 | A | * | 4/1998 | Kifuku et al. | ....... B62D 5/0463 |
| | | | | | 701/41 |
| 5,904,223 | A | * | 5/1999 | Shimizu et al. | ..... B62D 5/0463 |
| | | | | | 701/41 |
| 6,543,570 | B2 | | 4/2003 | Parker | |
| 6,594,568 | B2 | * | 7/2003 | Matsuoka | ............ B62D 5/0463 |
| | | | | | 701/41 |

(Continued)

FOREIGN PATENT DOCUMENTS

CN     105292246     2/2016
DE    102008021848   11/2009

*Primary Examiner* — Dale W Hilgendorf
(74) *Attorney, Agent, or Firm* — Frank A. MacKenzie; Hanley, Flight & Zimmerman, LLC (57) ABSTRACT

Methods and apparatus for determining kinetic friction in electromechanical steering actuators are disclosed herein. In some examples, the apparatus comprises a steering controller. In some examples, the steering controller is to apply an input torque to a steering system via a motor. In some examples, the steering controller is to determine an angular acceleration of the steering system in response to the input torque. In some examples, the steering controller is to determine a response torque based on the angular acceleration. In some examples, the steering controller is to determine a friction torque of the steering system based on the input torque and the response torque.

20 Claims, 6 Drawing Sheets

(56) References Cited

U.S. PATENT DOCUMENTS

| | | |
|---|---|---|
| 6,901,320 B2 | 5/2005 | Yao et al. |
| 8,111,147 B2 * | 2/2012 | Litkouhi .............. B62D 5/0463 180/446 |
| 9,061,702 B2 | 6/2015 | Reeve |
| 9,085,316 B2 | 7/2015 | Yang et al. |
| 2006/0086560 A1 * | 4/2006 | Furusho et al. ..... B62D 5/0463 180/446 |
| 2009/0150018 A1 | 6/2009 | Brown et al. |
| 2012/0173079 A1 * | 7/2012 | Oblizajek et al. ...... G01L 5/221 701/41 |
| 2013/0190988 A1 * | 7/2013 | Limpebunterng et al. .................. B62D 15/025 701/42 |
| 2014/0149000 A1 * | 5/2014 | Tamura et al. ...... B62D 5/0463 701/42 |
| 2015/0012180 A1 * | 1/2015 | Hayashi et al. ..... B62D 5/0463 701/41 |
| 2016/0023678 A1 | 1/2016 | Sakuma et al. |

* cited by examiner

METHODS AND APPARATUS FOR DETERMINING KINETIC FRICTION IN ELECTROMECHANICAL STEERING ACTUATORS

FIELD OF THE DISCLOSURE

This disclosure relates generally to methods and apparatus for determining kinetic friction and, more particularly, to methods and apparatus for determining kinetic friction in electromechanical steering actuators.

BACKGROUND

In recent years, automobiles have been equipped with electric power assisted steering systems. In such systems, a motor of an electromechanical steering actuator provides assistive torque to a steering linkage in response to a steering input by a driver to aid the driver in steering the automobile.

SUMMARY

Methods and apparatus for determining kinetic friction in electromechanical steering actuators are disclosed herein. In some examples, an apparatus is disclosed. In some disclosed examples, the apparatus comprises a steering controller. In some disclosed examples, the steering controller includes a motor driver to apply an input torque to a steering system via a motor. In some disclosed examples, the steering controller includes an angular acceleration determiner to determine an angular acceleration of the steering system in response to the input torque. In some disclosed examples, the steering controller includes a response torque determiner to determine a response torque based on the angular acceleration. In some disclosed examples, the steering controller includes a friction torque determiner to determine a friction torque of the steering system based on the input torque and the response torque.

In some examples, a method is disclosed. In some disclosed examples, the method comprises applying an input torque to a steering system via a motor. In some disclosed examples, the method comprises determining, by executing one or more instructions with a steering controller, an angular acceleration of the steering system in response to the input torque. In some disclosed examples, the method comprises determining, by executing one or more instructions with the steering controller, a response torque based on the angular acceleration. In some disclosed examples, the method comprises determining, by executing one or more instructions with the steering controller, a friction torque of the steering system based on the input torque and the response torque.

In some examples, a tangible computer readable storage medium comprising instructions is disclosed. In some disclose examples, the instructions, when executed, cause a processor to apply an input torque to a steering system via a motor. In some disclosed examples, the instructions, when executed, cause the processor to determine an angular acceleration of the steering system in response to the input torque. In some disclosed examples, the instructions, when executed, cause the processor to determine a response torque based on the angular acceleration. In some disclosed examples, the instructions, when executed, cause the processor to determine a friction torque of the steering system based on the input torque and the response torque.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Electromechanical steering actuators are used with electric power assisted steering (EPAS) systems to apply steering assistance torques to steering linkages. Such electromechanical steering actuators typically include a motor, a control unit (e.g., a controller and/or electronic control unit), and a mechanical gear set. The mechanical components of such steering actuators encounter friction (e.g., static and/or kinetic friction) relative to one another. This friction may cause an undesired lag and/or delay in the response of the steering actuator.

While it is possible to compensate for the friction encountered in steering actuators via control algorithms, such control algorithms commonly require an estimation of the encountered friction. The extent of friction encountered by the mechanical components of the steering actuator, however, is constantly changing. For example, the extent of friction encountered by the mechanical components of the steering actuator varies over the lifetime of the mechanical components, and may also vary based on piece-to-piece manufacturing inconsistencies. As the extent of friction varies, so too does the response of the steering actuator.

Conventional EPAS systems lack the ability to accurately estimate the friction encountered in a steering actuator online during operation of the EPAS system. Unlike such conventional EPAS systems, the EPAS systems described herein include example steering controllers for estimating the kinetic friction in steering actuators online during operation of the EPAS system. As a result of estimating the kinetic friction of the steering actuators in this manner, the example steering controllers described herein advantageously provide improved steering response and feel compared to at least some known steering systems. Thus, the example steering controllers described herein may advantageously be used in the manufacture and/or maintenance of automobiles, aircraft, wheeled vehicles, etc. equipped with EPAS systems.

The example steering controllers described herein communicate with a steering input sensor and a motor of an EPAS system. The EPAS system is included in a vehicle and further includes a steering wheel and steering linkage. In some examples, the steering controllers described herein are included in and/or is operatively coupled to (e.g., in electrical communication with) an electromechanical steering actuator that includes the motor of the EPAS system. In some examples, the steering controllers described herein are included in an electronic control unit (ECU) of the vehicle that monitors vehicle dynamics (e.g., velocity, acceleration, turning rate, etc.). Under normal operation, the steering controllers described herein detect when a driver applies an input to the steering linkage via the steering wheel and command the motor to provide assistive torque to the steering linkage until the driver input ceases. During a friction torque determination mode, the steering controllers described herein command the motor to apply an input torque to the steering linkage without a driver input (e.g., to turn the steering linkage a small angle without the driver turning the wheel). In some examples, the steering controllers described herein enter the friction torque determination mode when concurrently providing a haptic vehicle lane departure warning (e.g., a vibration of the steering linkage and steering wheel induced by the motor to alert a driver that the vehicle is drifting off a roadway). In some examples, vehicle lane departure warning vibrations are sinusoidal.

Figure 1:
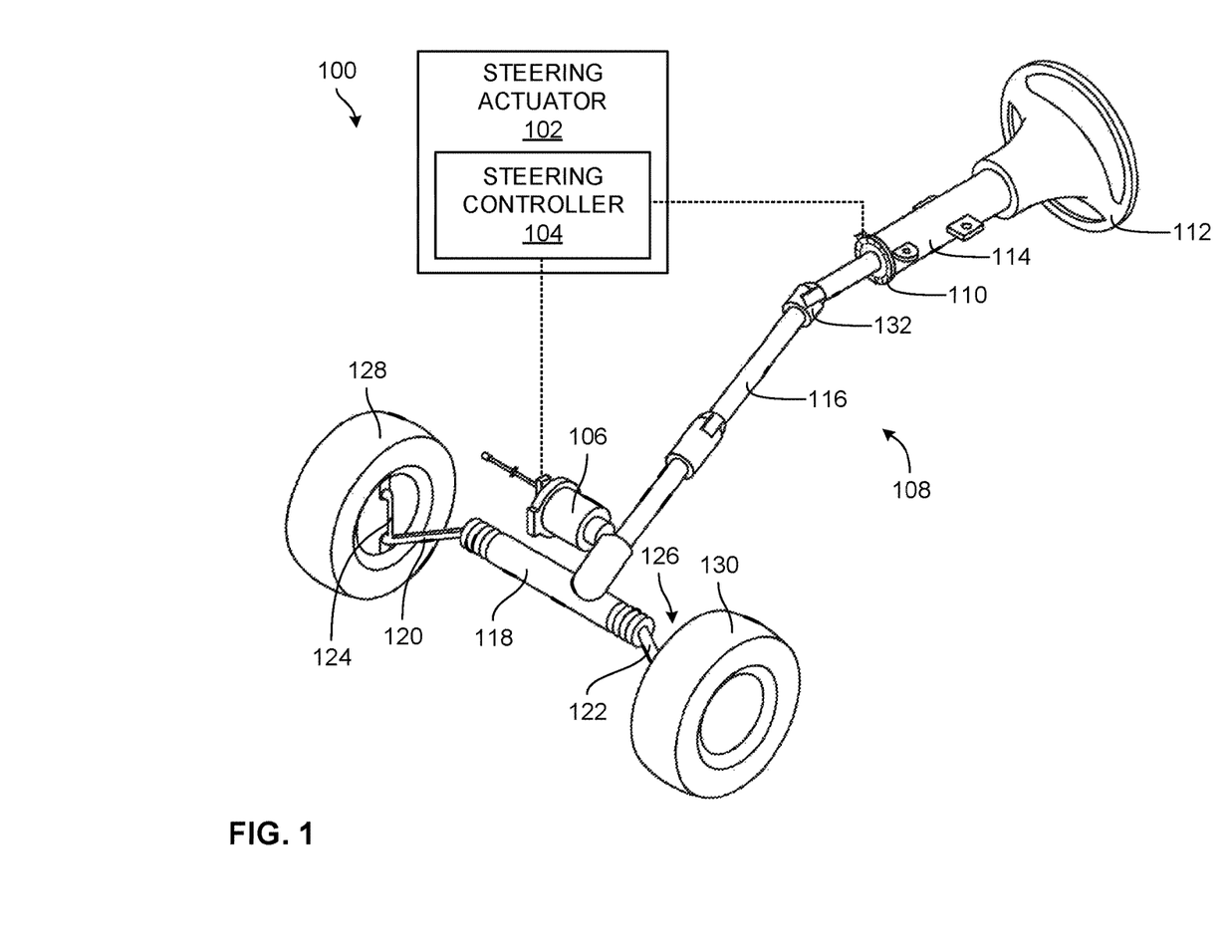
FIG. 1 is a schematic illustration of an example steering system implemented with an example steering controller constructed in accordance with the teachings of this disclosure.

FIG. 1 is a schematic illustration of an example steering system 100 constructed in accordance with the teachings of this disclosure. In the illustrated example of FIG. 1, the steering system 100 includes an example electromechanical steering actuator 102 having an example steering controller 104 and an example motor 106. The steering system 100 of FIG. 1 further includes an example steering linkage 108 and an example steering input sensor 110. The steering linkage 108 includes an example steering wheel 112, an example steering column 114, an example intermediate shaft 116, an example rack 118, a first example tie rod 120, a second example tie rod 122, a first example knuckle 124, a second example knuckle 126, a first example wheel 128, a second example wheel 130, and an example universal joint 132.

The steering wheel 112 is connected to the steering column 114. The steering column 114 is connected to the intermediate shaft 116 via the universal joint 132. The intermediate shaft 116 is connected to the rack 118 via a pinion (hidden in FIG. 1). The rack 118 is connected to the first and second tie rods 120, 122. The first and second tie rods 120, 122 are respectively connected to the first and second knuckles 124, 126. The first and second wheels 128, 130 are respectively rotatably engaged with the first and second knuckles 124, 126.

In the illustrated example of FIG. 1, the motor 106 of the electromechanical steering actuator 102 is coupled to and/or engaged with the intermediate shaft 116 of the steering linkage 108. The motor 106 may additionally and/or alternatively be coupled to and/or engaged with the rack 118 or the steering column 114 of the steering linkage 108. The motor 106 is an electric motor powered by an electrical system of the vehicle (not shown in FIG. 1).

In the illustrated example of FIG. 1 the steering input sensor 110 is coupled to and/or engaged with the steering column 114. The steering input sensor 110 may additionally and/or alternatively be coupled to and/or engaged with any of a shaft of the motor 106, the steering wheel 112, the intermediate shaft 116, the rack 118, the first tie rod 120, the second tie rod 122, the first knuckle 124, or the second knuckle 126. The steering input sensor 110 includes a torque sensor and a position sensor (e.g., the steering input sensor 110 is a combination torque/position sensor). The torque sensor may be any type of torque sensor (magnetoelastic, slip ring, wireless telemetric, rotary transformer, etc.) capable of sensing, measuring and/or detecting a torque (e.g., a moment) applied to the steering wheel 112. The position sensor may be any type of position sensor (e.g., Hall effect, giant magneto resistance, capacitive displacement, eddy current, electromechanical, etc.) capable of sensing, measuring and/or detecting a position (e.g., an angular position) of the steering wheel 112.

In the illustrated example of FIG. 1, the steering controller 104 is in electrical communication with the motor 106 and the steering input sensor 110 (as denoted by dashed lines in FIG. 1). Under normal operation, the steering controller 104 detects a steering input into the steering linkage 108 (e.g., a torque applied by a driver to the steering wheel 112, a steering movement caused by a driver turning the steering wheel 112, etc.) via the steering input sensor 110. The steering controller 104 commands the motor 106 to apply assistive torque to the steering linkage 108 based on the sensed steering input.

During a friction determination mode, the steering controller 104 of FIG. 1 commands the motor 106 to apply an input torque to the steering linkage 108. In some examples, the input torque may be a sinusoidally varying vibration with a relatively small amplitude. The input torque may additionally serve as a haptic warning to warn the driver about, for example, a vehicle lane departure (e.g., the input torque is a vehicle lane departure warning). In response to the induced input torque, the steering controller 104 measures the induced angular acceleration of the steering linkage 108 via the steering input sensor 110. The steering controller 104 then determines an applied torque to the steering linkage 108 based on the induced angular acceleration and a known inertia of the steering linkage 108. The steering controller 104 subsequently determines a friction torque for the steering linkage 108 and/or the electromechanical steering actuator 102 based on the input torque and the applied torque. Once the friction torque has been determined as described above, the steering controller 104 may then compensate for the determined friction torque during normal operation of the steering linkage 108 and/or the electromechanical steering actuator 102.

Figure 2:
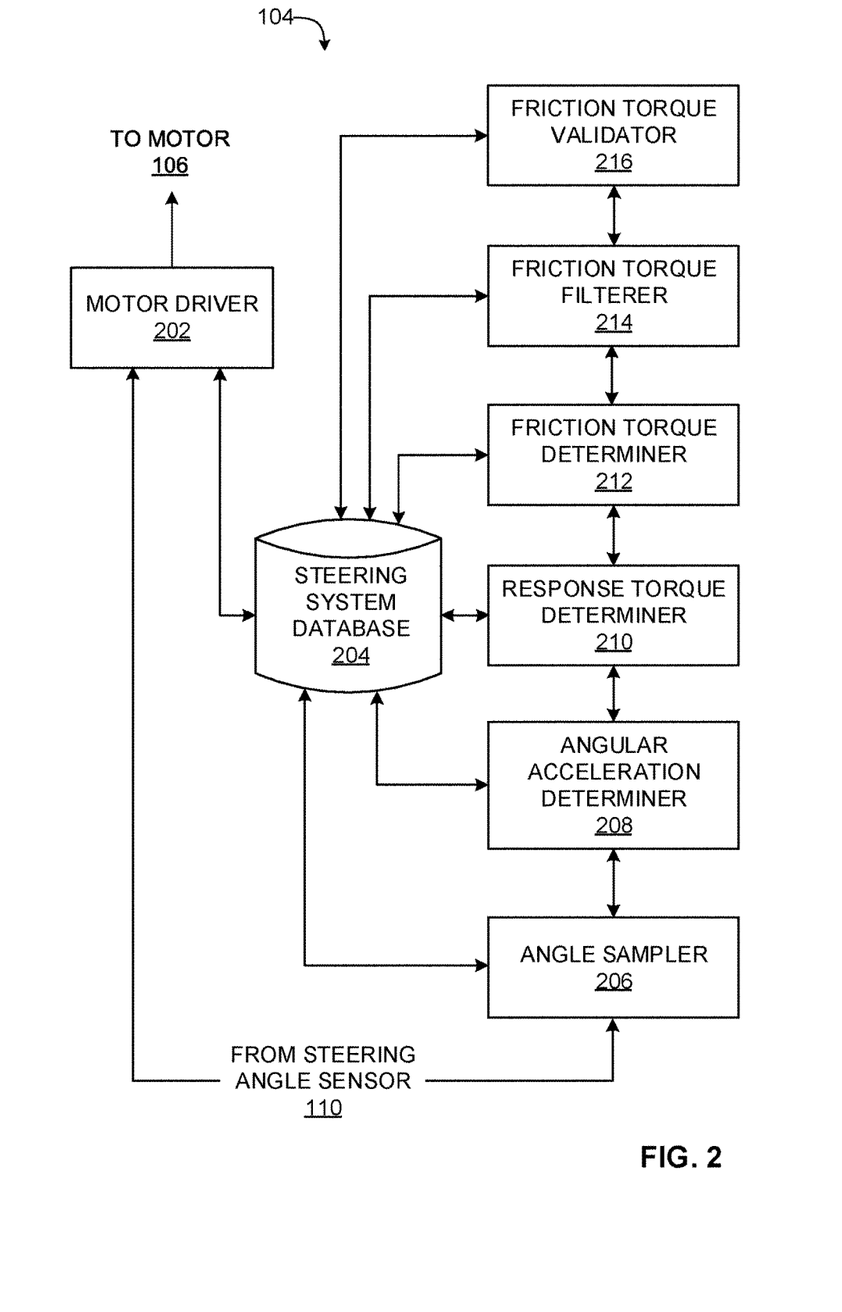
FIG. 2 is a block diagram of the example steering controller of FIG. 1.

FIG. 2 is a block diagram of the example steering controller 104 of FIG. 1. In the illustrated example of FIG. 2, the steering controller 104 includes an example motor driver 202, an example steering system database 204, an example angle sampler 206, an example angular acceleration determiner 208, an example response torque determiner 210, an example friction torque determiner 212, an example friction torque filterer 214, and an example friction torque validator 216. However, other example implementations of the steering controller 104 may include fewer or additional structures in accordance with the teachings of this disclosure. The motor driver 202, steering system database 204, angle sampler 206, angular acceleration determiner 208, response torque determiner 210, friction torque determiner 212, friction torque filterer 214, and/or friction torque validator 216 of the steering controller 104 of FIGS. 1 and 2 may be of any size(s), shape(s) and or configuration(s) that enable and/or facilitate the determination of kinetic friction for an electromechanical steering actuator.

In the illustrated example of FIG. 2, the motor driver 202 is operatively coupled to the motor 106 of FIG. 1, the steering input sensor 110 of FIG. 1, and the steering system database 204 of FIG. 2. The angle sampler 206 is operatively coupled to the steering input sensor 110 of FIG. 1, the steering system database 204 of FIG. 2, and the angular acceleration determiner 208 FIG. 2. The angular acceleration determiner 208 is operatively coupled to the steering system database 204, the angle sampler 206, and the response torque determiner 210. The response torque determiner 210 is operatively coupled to the steering system database 204, the angular acceleration determiner 208, and the friction torque determiner 212. The friction torque determiner 212 is operatively coupled to the steering system database 204, the response torque determiner 210, and the friction torque filterer 214. The friction torque filterer 214 is operatively coupled to the steering system database 204, the friction torque determiner 212, and the friction torque validator 216. The friction torque validator 216 is operatively coupled to the steering system database 204 and the friction torque filterer 214.

Under normal operation, the motor driver 202 of FIG. 2 receives steering input data (e.g., torque applied to the steering wheel 112, steering angle, steering angle rate, vehicle speed, yaw rate, etc.) from the steering input sensor 110 of FIG. 1 and/or the ECU of the vehicle. The motor driver 202 determines an assistive torque to be applied to the steering linkage 108 of FIG. 1 based on the steering input data. The motor driver 202 retrieves reference performance data of the motor 106 of FIG. 1 (e.g., torque outputs of the motor 106 with respect to applied voltages) from the steering system database 204. The motor driver 202 determines an input voltage that will produce the assistive torque based on the reference performance data (e.g., the motor driver 202 looks up a voltage that will cause the motor 106 to produce the determined assistive torque). The motor driver 202 applies the input voltage to the motor 106. The motor driver 202 measures current in windings of the motor 106 to monitor torque output of the motor 106.

During a friction torque determination mode, the motor driver 202 of FIG. 2 retrieves an input torque value from the steering system database 204. The motor driver 202 applies an input voltage corresponding to the input torque value to the motor 106 of FIG. 1, which causes the motor 106 to apply an input torque having an input torque value to the steering linkage 108 of FIG. 1. In some examples, the input torque value and the input voltage vary sinusoidally over a relatively brief period of time to cause the motor 106 to produce a corresponding sinusoidally varying torque over the brief period of time. In other words, in some examples, the motor driver 202 commands the motor 106 of FIG. 1 to vibrate (e.g., produce a haptic sensation such as a buzz).

The angle sampler 206 of FIG. 2 detects steering input data (e.g., steering angle positions) of the steering linkage 108 from the steering input sensor 110 of FIG. 1 produced in response to the input torque. The angle sampler 206 may detect and/or sample the steering input data based on a predetermined and/or specified sampling rate (e.g., 500 samples per second, 1000 samples per second, etc.).

The angular acceleration determiner 208 of FIG. 2 determines an angular acceleration of the steering linkage 108 based on the steering input data detected by the angle sampler 206 and the sampling rate at which such steering input data was detected. For example, the angular acceleration determiner 208 derives the angular acceleration based on a difference between two detected angular positions and a time difference between the detections of the two angular positions.

The response torque determiner 210 of FIG. 2 retrieves inertia data of the steering linkage 108 from the steering system database 204 (e.g., a predetermined sum of the moments of inertia for the components of the steering linkage 108). The response torque determiner 210, using Equation 1 below, determines a response torque (e.g., an applied torque), $\tau_r$, of the steering linkage 108 based on the inertia data, I, and the angular acceleration, $\alpha$.

$$\tau_r = I\alpha \quad \text{Equation 1}$$

The friction torque determiner 212 of FIG. 2 retrieves the input torque value from the steering system database 204. The friction torque determiner 212, using Equation 2 below, determines a friction torque, $\tau_f$, for the steering linkage 108 and/or the electromechanical steering actuator 102 of FIG. 1 based on the response toque, $\tau_r$, and the input torque value, $\tau_i$.

$$\tau_f = \tau_i - \tau_r \quad \text{Equation 2}$$

The friction torque determiner 212 of FIG. 2 stores the friction torque in the steering system database 204.

The friction torque filterer 214 retrieves the friction torque from the friction torque determiner 212 and/or the steering system database 204. The friction torque filterer 214 filters the friction torque to remove disturbances (e.g., noise). For example, the friction torque filterer 214 may remove accidental driver steering inputs (measured via the steering input sensor 110), estimated rack load based on vehicle data (e.g., vehicle speed, yaw rate, vehicle weight, vehicle size, etc.), static friction, stick-slip effects, etc. The friction torque filterer 214 stores the filtered friction torque in the steering system database 204.

The friction torque validator 216 retrieves the filtered friction torque from the friction torque filterer 214 and/or the steering system database 204. The friction torque validator 216 determines whether the friction torque was acquired during a valid driving situation (e.g., driving straight ahead) based on vehicle data. For example, the friction torque validator 216 may determine driving situation validity based on driver steering inputs (e.g., torque applied to the steering wheel 112 by the driver, steering angle, etc.), vehicle speed, yaw rate (e.g., vehicle angular acceleration), etc. The friction torque validator 216 stores the validated friction torque in the steering system database 204

Under normal operation, the motor driver 202 may retrieve the filtered and validated friction torque from the steering system database 204 to compensate for friction in the steering linkage 108 and/or the electromechanical steering actuator 102 when determining input voltages to provide assistive torque in response to steering inputs. In other words, the motor driver 202 augments input voltages to the motor 106 of FIG. 1 based on the friction torque.

While an example manner of implementing the example steering controller 104 of FIG. 1 is illustrated in FIG. 2, one or more of the elements, processes and/or devices illustrated in FIG. 2 may be combined, divided, re-arranged, omitted, eliminated and/or implemented in any other way. Further, the example motor driver 202, the example steering system database 204, the example angle sampler 206, the example angular acceleration determiner 208, the example response torque determiner 210, the example friction torque determiner 212, the example friction torque filterer 214, the example friction torque validator 216, and/or, more generally, the example steering controller 104 of FIG. 1 may be implemented by hardware, software, firmware and/or any combination of hardware, software and/or firmware. Thus, for example, any of the example motor driver 202, the example steering system database 204, the example angle sampler 206, the example angular acceleration determiner 208, the example response torque determiner 210, the example friction torque determiner 212, the example friction torque filterer 214, the example friction torque validator 216, and/or, more generally, the example steering controller 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this disclosure to cover a purely software and/or firmware implementation, at least one of the example motor driver 202, the example steering system database 204, the example angle sampler 206, the example angular acceleration determiner 208, the example response torque determiner 210, the example friction torque determiner 212, the example friction torque filterer 214, and/or the example friction torque validator 216, is/are hereby expressly defined to include a tangible computer readable storage device or storage disk such as a memory, a digital versatile disk (DVD), a compact disk (CD), a BLU-RAY DISC® etc. storing the software and/or firmware. Further still, the example steering controller 104 of FIG. 1 may include one or more elements, processes and/or devices in addition to, or instead of, those illustrated in FIG. 2, and/or may include more than one of any or all of the illustrated elements, processes and devices.

Figure 3:
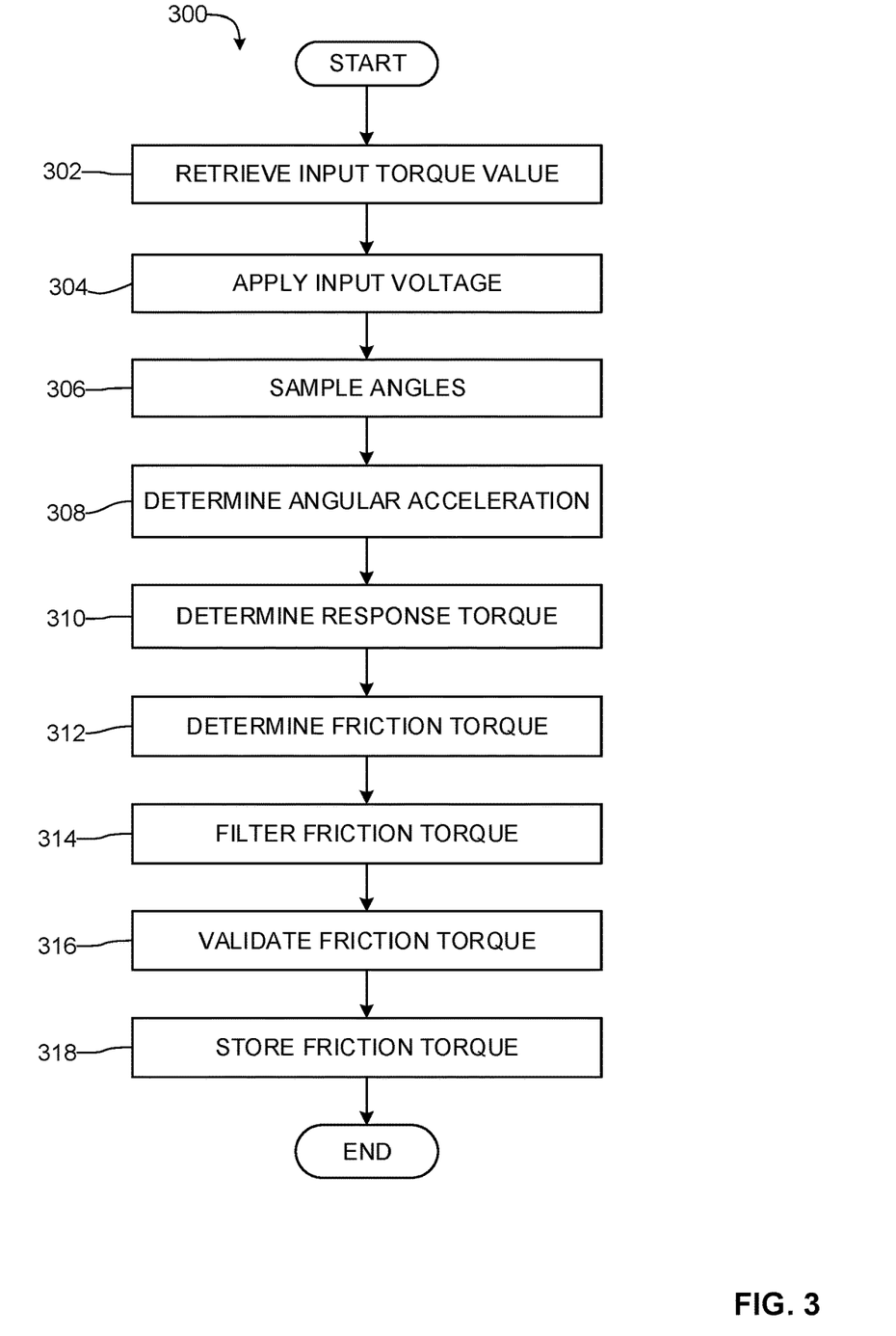
FIG. 3 is a flowchart representative of an example method that may be executed at the example steering controller of FIGS. 1-2 to determine the kinetic friction of the example electromechanical steering actuator of FIG. 1.
Figure 4:
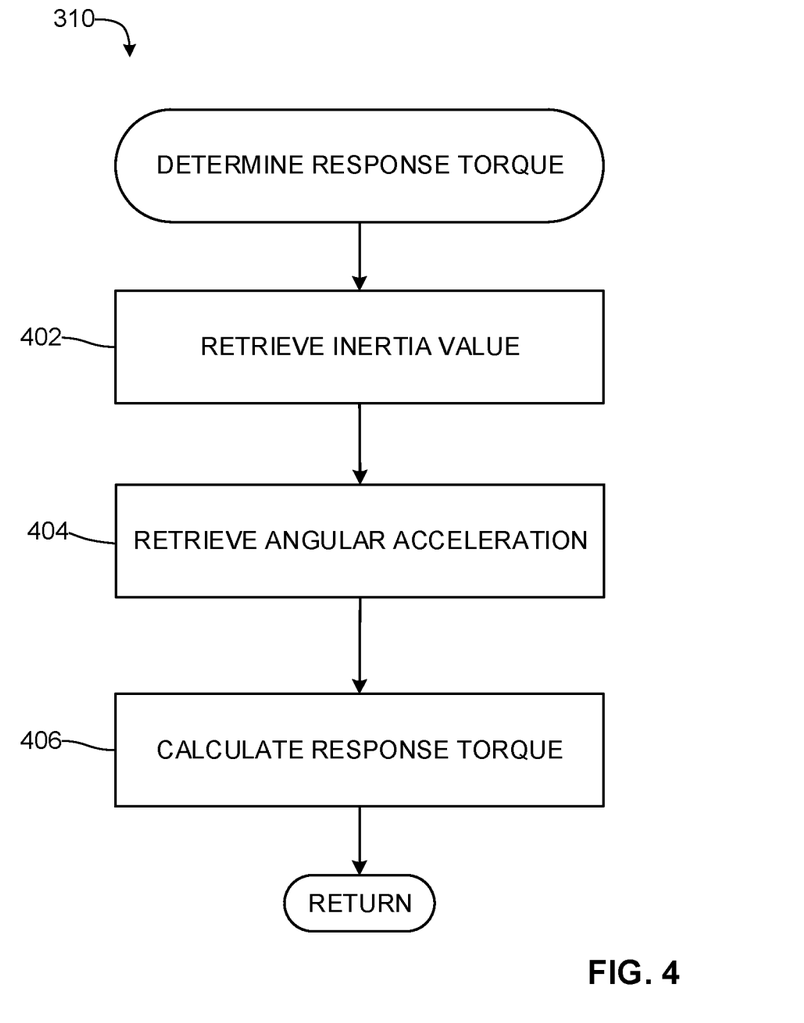
FIG. 4 is a flowchart representative of an example method that may be executed at the example steering controller of FIGS. 1-2 to determine a response torque.
Figure 5:
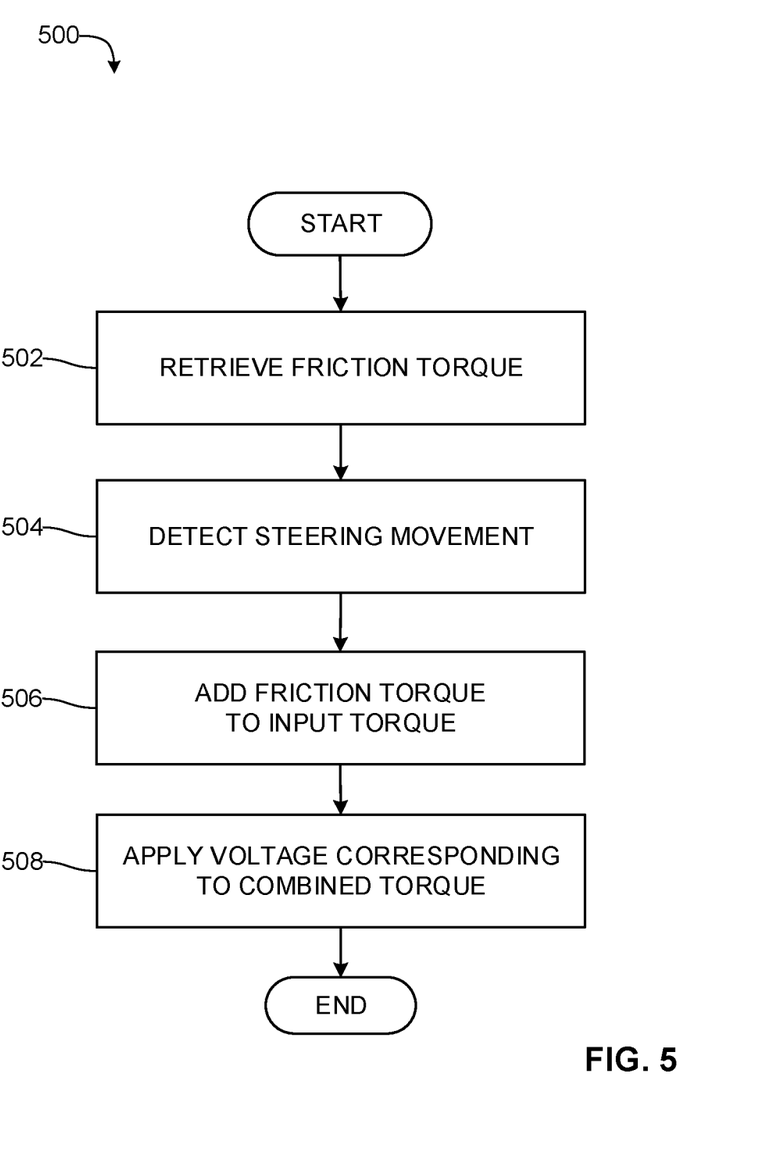
FIG. 5 is a flowchart representative of an example method that may be executed at the example steering controller of FIGS. 1-2 to compensate the electromechanical steering actuator of FIG. 1 in response to a determined kinetic friction of the electromechanical steering actuator.

Flowcharts representative of example methods for implementing the example steering controller 104 of FIGS. 1 and/or 2 are shown in FIGS. 3, 4, and 5. In these example, the methods may be implemented using machine-readable instructions that comprise one or more program(s) for execution by a processor such as the example processor 602 shown in the example processor platform 600 discussed below in connection with FIG. 6. The one or more program(s) may be embodied in software stored on a tangible computer readable storage medium such as a CD-ROM, a floppy disk, a hard drive, a digital versatile disk (DVD), a BLU-RAY DISC® or a memory associated with the processor 602, but the entire program(s) and/or parts thereof could alternatively be executed by a device other than the processor 602 and/or embodied in firmware or dedicated hardware. Further, although the example program(s) is/are described with reference to the flowcharts illustrated in FIGS. 3, 4, and 5 many other methods of implementing the example steering controller 104 of FIGS. 1 and/or 2 may alternatively be used. For example, the order of execution of the blocks may be changed, and/or some of the blocks described may be changed, eliminated, or combined.

As mentioned above, the example methods of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of an example method 300 that may be executed at the example steering controller 104 of FIGS. 1-2 to determine the kinetic friction of the example electromechanical steering actuator 102 of FIG. 1. The example method 300 begins when the motor driver 202 of FIG. 2 retrieves an input torque value from the steering system database 204 of FIG. 2 (block 302). In some examples, the input torque value corresponds to a haptic alert for a driver of a vehicle (e.g., a lane departure warning that vibrates the steering wheel). Following block 302, control of the example method 300 of FIG. 3 proceeds to block 304.

At block 304, the motor driver 202 of FIG. 2 applies an input voltage corresponding to the input torque value (block 304). Following block 304, control of the example method 300 of FIG. 3 proceeds to block 306.

At block 306, the angle sampler 206 of FIG. 2 collects steering angle measurements from the steering input sensor 110 of FIG. 1 based on a sampling rate (block 306). Following block 306, control of the example method 300 of FIG. 3 proceeds to block 308.

At block 308, the angular acceleration determiner 208 of FIG. 2 determines an angular acceleration of the steering linkage 108 of FIG. 1 based on the steering angle measurements and the sampling rate (block 308). Following block 308, control of the example method 300 of FIG. 3 proceeds to block 310.

At block 310, the response torque determiner 210 of FIG. 2 determines a response torque of the steering linkage 108 of FIG. 1 based on the determined angular acceleration and inertia data of the steering linkage 108 (e.g., a hypothetical applied torque to the steering linkage that would have resulted in the determined angular acceleration) (block 310). An example method that may be used to implement block 310 of the example method 300 of FIG. 3 is described in greater detail below in connection with FIG. 4. Following block 310, control of the example method 300 of FIG. 3 proceeds to block 312.

At block 312, the friction torque determiner 212 of FIG. 2 determines a friction torque of the steering linkage 108 and/or the electromechanical steering actuator 102 of FIG. 1 based on the response torque and the input torque value. For example, the friction torque determiner 212 may determine the friction torque of the steering linkage 108 and/or the electromechanical steering actuator 102 based on the response torque and the input torque value utilizing Equation 2 described above. Following block 312, control of the example method 300 of FIG. 3 proceeds to block 314.

At block 314, the friction torque filterer 214 filters the friction torque determined by the friction torque determiner 212 based on vehicle data. For example, the friction torque filterer 214 may filter the friction torque based on driver steering inputs, an estimated rack load, static friction, stick-slip effects, etc. Following block 314, control of the example method 300 of FIG. 3 proceeds to block 316.

At block 316, the friction torque validator 216 determines whether the friction torque was determined based on data acquired during a valid driving situation (e.g., straight ahead, highway driving, etc.) based on vehicle data. For example, the friction torque validator 216 may determine driving situation validity based on driver steering inputs, vehicle speed, vehicle yaw rate, etc. Following block 316, control of the example method 300 of FIG. 3 proceeds to block 318.

At block 318, the friction torque validator 216 of FIG. 2 stores the determined, filtered, and validated friction torque in the steering system database 204 of FIG. 2. Following block 318, the example method 300 ends.

FIG. 4 is a flowchart representative of an example method 310 that may be executed at the example steering controller 104 of FIGS. 1-2 to determine a response torque. Example operations of blocks 402, 404 and 406 of FIG. 4 may be used to implement block 310 of FIG. 3.

The example method 310 of FIG. 4 begins when the response torque determiner 210 of FIG. 2 retrieves a combined steering system inertia value from the steering system database 204 of FIG. 2 (e.g., a sum of the moments of the inertia of the components of the steering linkage 108 of FIG. 1) (block 402). Following block 402, control of the example method 310 of FIG. 4 proceeds to block 404.

At block 404, the response torque determiner 210 of FIG. 2 retrieves the determined angular acceleration from the angular acceleration determiner 218 of FIG. 2 (block 404). Following block 404, control of the example method 310 of FIG. 4 proceeds to block 406.

At block 406, the response torque determiner 210 of FIG. 2 calculates the response torque based on the inertia value and the determined angular acceleration (block 406). For example, the response torque determiner 210 may calculate the response torque based on the inertia value and the determined angular accelerations utilizing Equation 1 described above. Following block 406, the example method 310 of FIG. 4 ends and control returns to a calling function or process such as the example method of FIG. 3 and/or block 310 thereof.

FIG. 5 is a flowchart representative of an example method 500 that may be executed at the example steering controller 104 of FIGS. 1-2 to compensate the electromechanical steering actuator 102 of FIG. 1 in response to a determined kinetic friction of the electromechanical steering actuator 102. The example method 500 begins when the motor driver 202 of FIG. 2 retrieves a determined, filtered, and validated friction torque (as described connection with FIG. 3) from the steering system database 204 of FIG. 2. Following block 502, control of the example method 500 of FIG. 5 proceeds to block 504.

At block 504, the motor driver 202 of FIG. 2 detects a steering movement based on steering input data from the steering input sensor 110 of FIG. 1. Following block 504, control of the example method 500 of FIG. 5 proceeds to block 506.

At block 506, the motor driver 202 of FIG. 2 combines the friction torque with an input torque corresponding to the detected steering movement (e.g., the motor driver 202 augments the torque value to be applied by the motor 106 of FIG. 1 to compensate for friction in the steering linkage 108 and/or the electromechanical steering actuator 102) (block 506). Following block 506, control of the example method 500 of FIG. 5 proceeds to block 508.

At block 508, the motor driver 202 of FIG. 2 applies a voltage to the motor 106 of FIG. 1 corresponding to the combined torque (block 508). Following block 508, the example method 500 ends.

Figure 6:
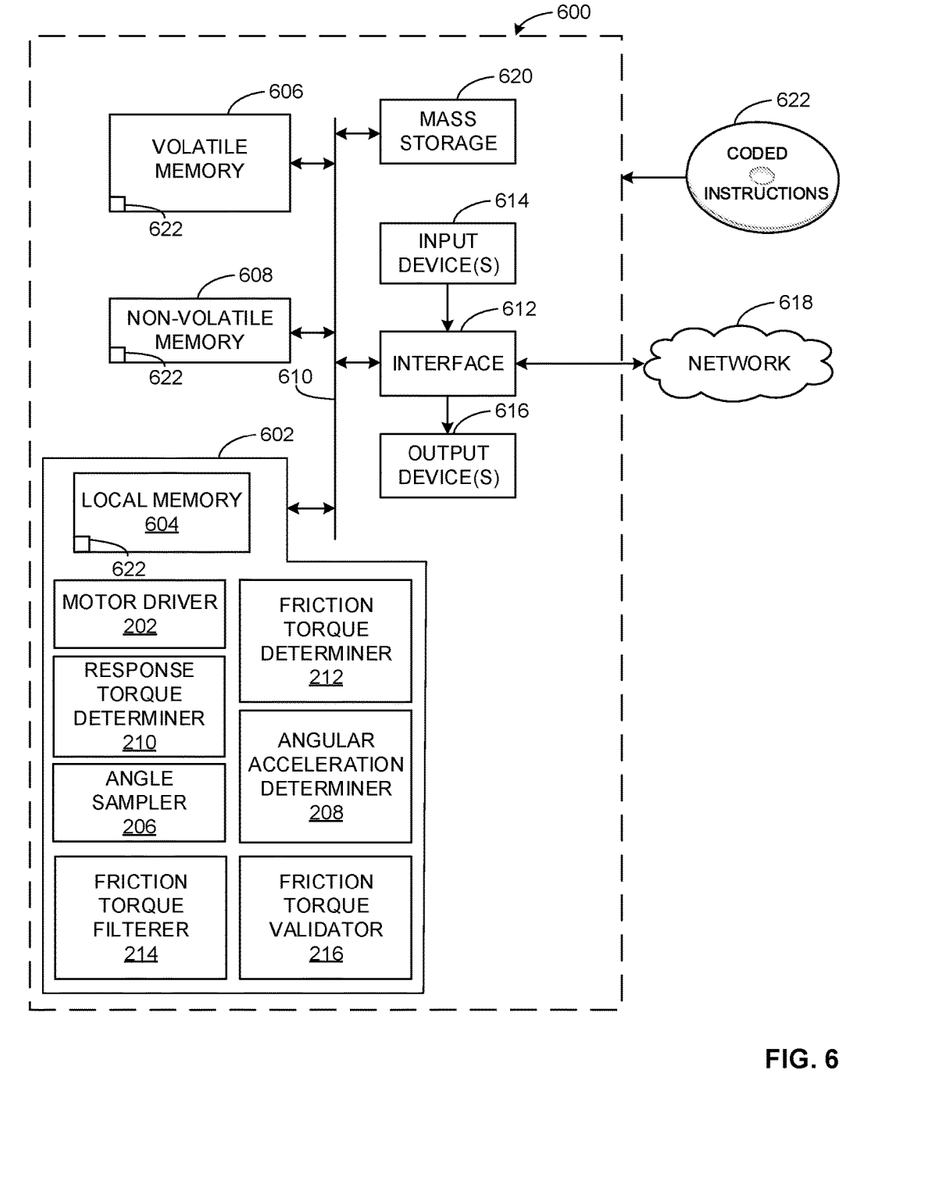
FIG. 6 is a block diagram of an example processor platform capable of executing instructions to implement the methods of FIGS. 3, 4, and/or 5 and the example steering controller of FIGS. 1 and/or 2.

FIG. 6 is a block diagram of an example processor platform 600 capable of executing instructions to implement the methods of FIGS. 3-5 and the example steering controller 104 of FIGS. 1 and/or 2. The processor platform 600 can be any type of computing device.

The processor platform 600 of the illustrated example includes a processor 602. The processor 602 of the illustrated example is hardware. For example, the processor 602 can be implemented by one or more integrated circuit(s), logic circuit(s), microprocessor(s) or controller(s) from any desired family or manufacturer. The processor 602 of the illustrated example includes a local memory 604 (e.g., a cache), and further includes the example motor driver 202, the example angle sampler 206, the example angular acceleration determiner 208, the example response torque determiner 210, and the example friction torque determiner 212 of FIG. 2.

The processor 602 of the illustrated example is in communication with a main memory including a volatile memory 606 and a non-volatile memory 608 via a bus 610. The volatile memory 606 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 608 may be implemented by flash memory and/or any other desired type of memory device. Access to the main memory 606, 608 is controlled by a memory controller.

The processor platform 600 of the illustrated example also includes an interface circuit 612. The interface circuit 612 may be implemented by any type of interface standard, such as an Ethernet interface, a universal serial bus (USB), and/or a PCI express interface.

In the illustrated example, one or more input devices 614 are connected to the interface circuit 612. The input device(s) 614 permit(s) a user to enter data and commands into the processor 602. The input device(s) 614 can be implemented by, for example, an audio sensor, a microphone, a camera (still or video), a keyboard, a button, a mouse, a touchscreen, a track-pad, a trackball, isopoint and/or a voice recognition system.

One or more output devices 616 are also connected to the interface circuit 612 of the illustrated example. The output devices 616 can be implemented, for example, by display devices (e.g., a light emitting diode (LED), an organic light emitting diode (OLED), a liquid crystal display, a cathode ray tube display (CRT), a touchscreen, a tactile output device and/or speakers). The interface circuit 612 of the illustrated example, thus, typically includes a graphics driver card, a graphics driver chip or a graphics driver processor.

The interface circuit 612 of the illustrated example also includes a communication device such as a transmitter, a receiver, a transceiver, a modem and/or network interface card to facilitate exchange of data with external machines (e.g., computing devices of any kind) via a network 618

(e.g., an Ethernet connection, a digital subscriber line (DSL), a telephone line, coaxial cable, a cellular telephone system, etc.).

The processor platform 600 of the illustrated example also includes one or more mass storage devices 620 for storing software and/or data. Examples of such mass storage devices 620 include floppy disk drives, hard drive disks, compact disk drives, BLU-RAY DISC® drives, RAID systems, and digital versatile disk (DVD) drives.

Coded instructions 622 for implementing the methods of FIGS. 3-5 may be stored in the mass storage device 620, in the volatile memory 606, in the non-volatile memory 608, and/or on a removable tangible computer readable storage medium such as a CD or DVD.

From the foregoing, it will be appreciated that the above disclosed apparatus and methods may advantageously aid in compensating for friction internal to an electromechanical steering actuator and/or an electric power assisted steering system. The disclosed apparatus and methods advantageously determine such internal friction online during operation of the electromechanical steering actuator and/or the electric power assisted steering system. By determining a friction torque in this manner, assistive torque applied to a steering linkage in response to a steering input from a driver may be accurately augmented to overcome such internal friction. Thus, steering output may better correspond to the steering input, resulting in an improved (e.g., more predictable) steering response and driving experience for the driver. Further, by producing more predictable steering responses, steering corrections by the driver may be reduced. As a result, vehicle fuel efficiency may be improved and wear on vehicle components (e.g., tires) and associated replacement and disposal costs may be reduced.

In some examples, an apparatus is disclosed. In some disclosed examples, the apparatus comprises a steering controller. In some disclosed examples, the steering controller includes a motor driver to apply an input torque to a steering system via a motor. In some disclosed examples, the steering controller includes an angular acceleration determiner to determine an angular acceleration of the steering system in response to the input torque. In some disclosed examples, the steering controller includes a response torque determiner to determine a response torque based on the angular acceleration. In some disclosed examples, the steering controller includes a friction torque determiner to determine a friction torque of the steering system based on the input torque and the response torque.

In some disclosed examples of the apparatus, the input torque is based on a voltage applied to the motor.

In some disclosed examples of the apparatus, the friction torque is equal to the response torque subtracted from the input torque.

In some disclosed examples of the apparatus, the response torque determiner is to determine the response torque further based on an inertia of the steering system.

In some disclosed examples of the apparatus, the steering controller is to add the friction torque to a second input torque applied to the steering system in response to a steering movement.

In some disclosed examples of the apparatus, the angular acceleration determiner is to determine the angular acceleration of the steering system in response to the input torque based on at least two angular positions of the steering system measured via an angle sampler of the steering controller and the angle sampler is to measure the at least two angular positions based on a sampling rate.

In some disclosed examples of the apparatus, the input torque is to vary sinusoidally and is to be applied to the steering system during a lane departure warning.

In some examples, a method is disclosed. In some disclosed examples, the method comprises applying an input torque to a steering system via a motor. In some disclosed examples, the method comprises determining, by executing one or more instructions with a steering controller, an angular acceleration of the steering system in response to the input torque. In some disclosed examples, the method comprises determining, by executing one or more instructions with the steering controller, a response torque based on the angular acceleration. In some disclosed examples, the method comprises determining, by executing one or more instructions with the steering controller, a friction torque of the steering system based on the input torque and the response torque.

In some disclosed examples of the method, the input torque is based on a voltage applied to the motor.

In some disclosed examples of the method, the friction torque is equal to the response torque subtracted from the input torque.

In some disclosed examples of the method, determining the response torque is further based on an inertia of the steering system.

In some disclosed examples, the method further includes adding the friction torque to a second input torque applied to the steering system in response to a steering movement.

In some disclosed examples of the method, determining the angular acceleration of the steering system in response to the input torque includes measuring at least two angular positions of the steering system and measuring the at least two angular positions of the steering system is performed based on a sampling rate.

In some disclosed examples of the method, the input torque varies sinusoidally and is applied to the steering system during a lane departure warning In some examples, a tangible computer readable storage medium comprising instructions is disclosed. In some disclose examples, the instructions, when executed, cause a processor to apply an input torque to a steering system via a motor. In some disclosed examples, the instructions, when executed, cause the processor to determine an angular acceleration of the steering system in response to the input torque. In some disclosed examples, the instructions, when executed, cause the processor to determine a response torque based on the angular acceleration. In some disclosed examples, the instructions, when executed, cause the processor to determine a friction torque of the steering system based on the input torque and the response torque.

In some disclosed examples, the instructions, when executed, cause the processor to apply the input torque to the steering system by applying a voltage to the motor.

In some disclosed examples, the friction torque is equal to the response torque subtracted from the input torque.

In some disclosed examples, the instructions, when executed, cause the processor to determine the response torque based further on an inertia of the steering system.

In some disclosed examples, the instructions, when executed, further cause the processor to add the friction torque to a second input torque applied to the steering system in response to a steering movement.

In some disclosed examples, the instructions, when executed, cause the processor to determine the angular acceleration of the steering system in response to the input torque by measuring at least two angular positions of the steering system. In some disclosed examples, the measuring of the at least two angular positions of the steering system is performed based on a sampling rate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a steering controller including:
        a motor driver to apply a sinusoidally varying input torque to a steering system via a motor;
        an angle sampler to detect steering angle position data from a steering input sensor in response to the applied input torque and based on a sampling rate;
        an angular acceleration determiner to determine an angular acceleration of the steering system based on the steering angle position data and the sampling rate;
        a response torque determiner to determine a response torque based on the angular acceleration and predetermined inertia data of the steering system; and
        a friction torque determiner to determine a friction torque of the steering system based on the input torque and the response torque.

2. The apparatus of claim 1, wherein the input torque is based on a voltage applied to the motor.

3. The apparatus of claim 1, wherein the friction torque is equal to the response torque subtracted from the input torque.

4. The apparatus of claim 1, wherein the steering controller is to add the friction torque to a second input torque applied to the steering system in response to a steering movement.

5. The apparatus of claim 1, wherein the steering angle position data includes at least two angular positions of the steering system measured via the angle sampler based on the sampling rate.

6. The apparatus of claim 1, wherein the input torque is to be applied to the steering system during a lane departure warning.

7. The apparatus of claim 1, wherein the steering controller further includes a friction torque filterer to filter the friction torque based on vehicle data.

8. The apparatus of claim 7, wherein the steering controller further includes a friction torque validator to determine, based on vehicle data, whether the filtered friction torque was acquired during a valid driving situation.

9. The apparatus of claim 8, wherein the steering controller is to add the filtered and validated friction torque to a second input torque applied to the steering system in response to a steering movement.

10. A method comprising:
    applying a sinusoidally varying input torque to a steering system via a motor;
    detecting, by executing one or more instructions with a steering controller, steering angle position data from a steering input sensor in response to the applied input torque and based on a sampling rate;
    determining, by executing one or more instructions with the steering controller, an angular acceleration of the steering system based on the steering angle position data and the sampling rate;
    determining, by executing one or more instructions with the steering controller, a response torque based on the angular acceleration and predetermined inertia data of the steering system; and
    determining, by executing one or more instructions with the steering controller, a friction torque of the steering system based on the input torque and the response torque.

11. The method of claim 10, wherein the input torque is based on a voltage applied to the motor.

12. The method of claim 10, wherein the friction torque is equal to the response torque subtracted from the input torque.

13. The method of claim 10, further including adding the friction torque to a second input torque applied to the steering system in response to a steering movement.

14. The method of claim 10, wherein determining the steering angle position data includes at least two angular positions of the steering system measured based on the sampling rate.

15. The method of claim 10, wherein the input torque is applied to the steering system during a lane departure warning.

16. A tangible computer readable storage medium comprising instructions which, when executed, cause a processor to at least:
    apply a sinusoidally varying input torque to a steering system via a motor;
    detect steering angle position data from a steering input sensor in response to the applied input torque and based on a sampling rate;
    determine an angular acceleration of the steering system based on the steering angle position data and the sampling rate;
    determine a response torque based on the angular acceleration and predetermined inertia data of the steering system; and
    determine a friction torque of the steering system based on the input torque and the response torque.

17. The tangible computer readable storage medium of claim 16, wherein the instructions, when executed, cause the processor to apply the input torque to the steering system by applying a voltage to the motor.

18. The tangible computer readable storage medium of claim 16, wherein the friction torque is equal to the response torque subtracted from the input torque.

19. The tangible computer readable storage medium of claim 16, wherein the instructions, when executed, further cause the processor to add the friction torque to a second input torque applied to the steering system in response to a steering movement.

20. The tangible computer readable storage medium of claim 16, wherein the steering angle position data includes at least two angular positions of the steering system measured based on the sampling rate.

* * * * *